United States Patent Office 2,726,358
Patented Dec. 6, 1955

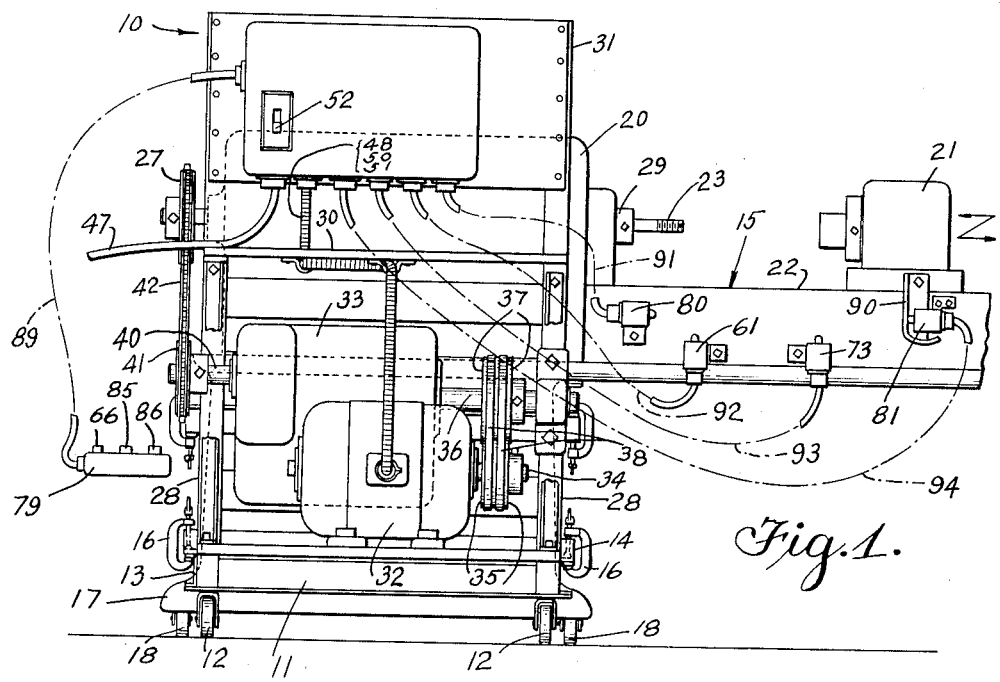

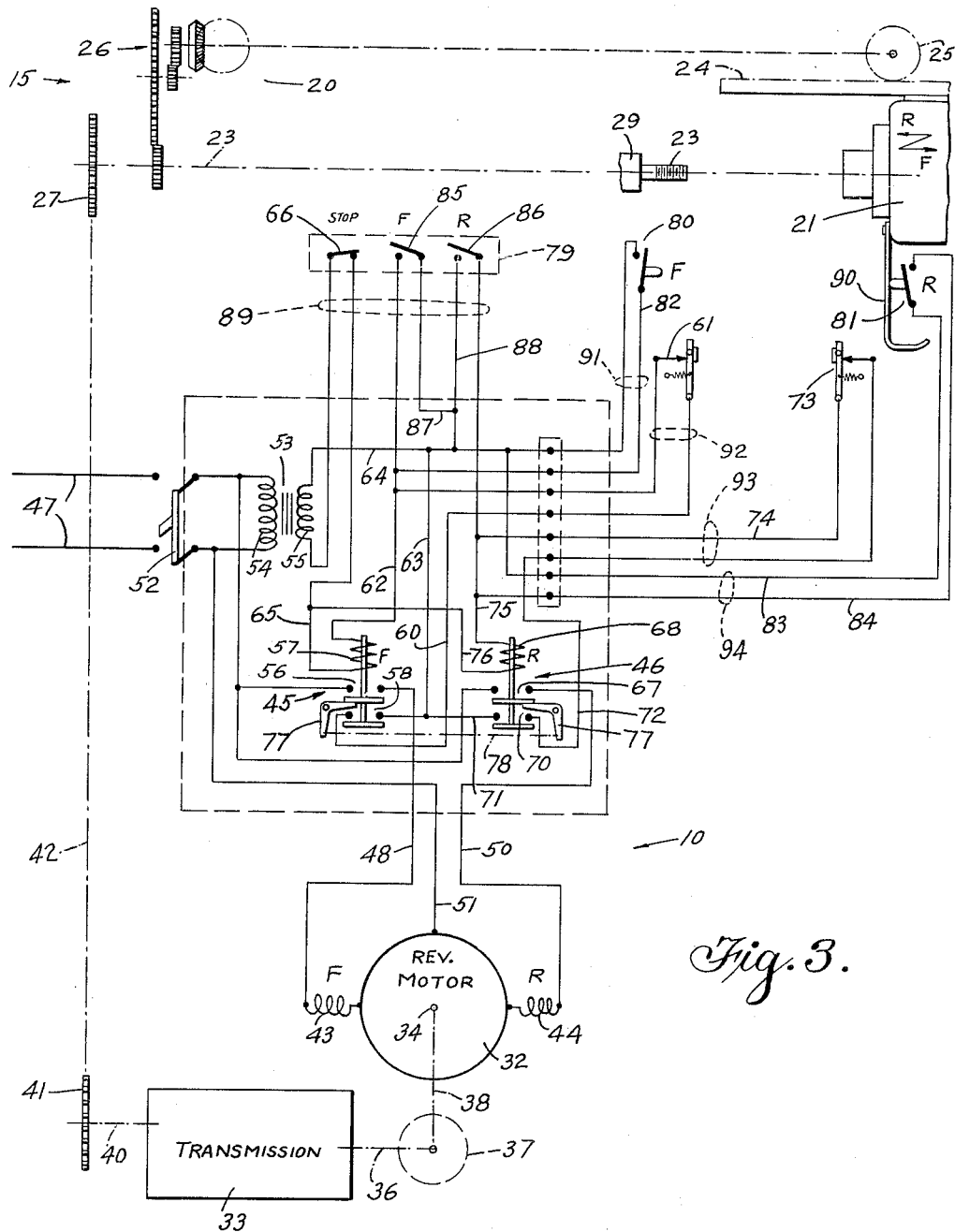

2,726,358

PORTABLE ELECTRIC MOTOR POWER UNIT

George E. Barnhart, Los Angeles County, Calif.

Application June 25, 1954, Serial No. 439,289

8 Claims. (Cl. 318—17)

The present invention relates generally to a power unit and relates more specifically to a portable power unit adapted for use in conjunction with any of a variety of machine tools or other driven machines wherein a reciprocating or a rotating element is required to move to a predetermined position and instantaneously change direction to move in reverse.

The device of the present invention is adapted specifically for use with such well-known machines as, for example, shapers, milling machines, drill presses, tapping machines, lathes, planers, portable elevators and other like precision stroke devices such as oil wells or the like, and is further adapted to convert such tools and stroke devices for precision automatic operation. Such conversion of machines of the above types, for example, will permit precision stroking or rotary oscillation thereof with attendant movement to a predetermined precise position at the end of each stroke or rotary position.

In many types of machine operations as, for example, in thread cutting, it has been the usual machine practice either to allow for relief at a bottom end of proposed threads or to go to great lengths in actually running exterior or interior threads completely up to an outwardly or inwardly extended flange. In either case, the excess machine time required to produce a thread relief adjacent a flange, which in some cases is dangerous and unsatisfactory as to the strength of the part, or to laboriously cut threads up to the flange, if it is possible to do so at all, has added extensively to the cost of articles made in this manner. Additionally, in some cases, it is extremely desirable to extend such threads up to the beforementioned flange in order to add to the thread contact area of any nut or the like that may be placed thereon. The device of the present invention contemplates the provision of mechanism whereby threads may be cut or run on a shaft directly up to a precision point with an instantaneously reversal of the cutting tool being effected at the precise limit of travel. This example is but one of many types of precision machine operations wherein former devices have been unable to accomplish working to a predetermined stroke end position due to mechanical, pneumatic, magnetic or other type of reversing mechanism, the inherent lack of precision operation thereof and general inability to repeat multiple similar operations while still maintaining precison stroking of cutting or forming tools or the like. With a milling machine, for example, it is often desirable to mill a surface to a predetermined line, shoulder or the like, with the mill cuts being perpendicular to such shoulder or line. Previous devices were unable, for the reasons set forth above, to accomplish such a machine operation without a rough or otherwise undesirable and being established along the termination of the cut. A similar situation has also been found to exist with other similar types of machines, such as, for example, shapers or planers. With lathes utilized, for example, for boring of a workpiece and wherein a movable carriage may be adapted to carry a boring tool, it is often desirable to bore, ream and possibly tap to a predetermined depth, with positive reversal of cutting and tapping tools being accomplished at a predetermined precise point in a workpiece, or to push or pull drawing or spinning tools or workpieces. The present device provides a power unit and remote control therefor that may be used to accomplish such a series of machine operations.

Many recent developments have been brought forward that allege the instantaneous reversal of movable element on a machine; however, even though this may, to some extent, be accomplished by some of these contemporary mechanisms, it is evident from a review thereof that these devices are not only complex in construction and operation, expensive in manufacturing and cumbersome in use, but the vary nature thereof, including complex linkages, clutches, brakes and magnetic arrangements, prevents the holding of precise tolerances when used for the purpose demanded by present day machine practices where tolerances must be held to very close limits. Reference is made to any of the contemporary books, pamphlets and magazines which define such prior and contemporary structures and set forth the inadequacies thereof.

Further, in contemplation of the present invention, in times of national or local step-up in manufacturing schedules and when new manufacturing facilities must be set up within a short period of time or must be moved to new locations, it is desirable to have machine tools or the like that may be readily moved from place to place and which may be rendered automatic by lightweight, portable equipment and controls. By utilizing a combination tool and control arrangement that is physically defined by at least two pieces of equipment, the tool may also be more easily moved when such is required.

Accordingly, it is one object of the present invention to provide a novel, portable power unit with suitable controls forming a portion thereof, whereby various types of machines may be converted for automatic operation and reversed in direction of movement at a precise predetermined position.

Another object of the present invention is to provide a portable power unit having a self-contained electrically operated power source that may be moved into position adjacent a machine tool or other stroking device for operation thereof in a manner as to control the direction of and the distance traveled by a reciprocating element therein.

It is a further object of the present invention to provide a novel power unit that is portable in nature and wherein novel electrical circuitry is employed electrically to effect instantaneous reversal and subsequent shutdown of a movable element carried on a machine tool.

It is a still further important object of the present invention to provide a portable power unit, having remotely positionable switch means operating through a suitably relay operated switching circuit to effect changes in direction of a reversible motor which may be connected for operation of a movable element on a machine tool and thereby effect reciprocating movement of such element from one precise end limit to another with shutdown being available, if desired, immediately following reverse movement of the element adjacent at least one end of travel thereof.

It is another important object of the present invention to provide portable machine tools together with a portable precision method of power operation control thereof, and wherein a multiplicity of operations may be controlled.

It is still another important object of the present invention to provide for precision location of movable elements of a machine tool, stroking a rotating device, through use of a controlling means positioned at the work point, thereby eliminating lost motion factors in other components and driving arrangements of the tool or the like.

A further object of the invention is to provide a precision position limiting means for control of a machine tool or die arrangement having heavy duty or cumbersome elements such as hammer heads, tools or workpieces used with draw benches and metal spinning machines or the like.

A still further object of the invention is to provide a precision control for machine tools or the like and wherein supplementary switching elements are provided for remote operation of the machine.

Other and further important objects of the present invention will become apparent from the disclosures of the following detailed specification, appended claims and accompanying drawings, wherein:

Fig. 1 is a front elevational view of the power unit of the present invention shown in use with a lathe type machine tool;

Fig. 2 is a side elevational view of the power unit and lathe; and

Fig. 3 is a schematic circuit diagram and gear train arrangement as utilized with the present invention.

With reference to the drawings, wherein like numerical characters denote like parts, and referring primarily to Figs. 1 and 2, the portable power unit of the present invention comprises a frame structure 10, having a base shelf portion 11 and being mounted on suitable casters 12. By use of upwardly extending angle members 13, the power unit may be removably secured to frame members 14 of a lathe, indicated generally at 15, as by suitable clamps 16 or the like. In this connection, the lathe 15 is shown by way of example only and as illustrating one of a variety of types of machine tools that may be utilized with the present invention, it being understood that this example given is only for reference purposes and that other types of machines may be used without departing from the spirit and scope of the present invention.

For descriptive purposes to complete the example defining use of the present invention, the lathe 15 includes a base 17 that may be supported on suitable castors 18. As per the usual practice, the lathe also includes a head portion 20 and a reciprocable carriage 21, forming a movable element adapted for reciprocation in ways 22. The head 20 may have a shaft 23 extended therefrom through an operation head 29 on which a workpiece may be fastened in any well-known manner. The carriage 21 may also be fitted with a cutting tool further in the well-known manner in such devices. With reference to Fig. 3, the carriage 21 may be reciprocated as by a rack or screw arrangement 24 driven by a gear 25 that is connected to a suitable gear train 26 which is, in turn, connected to be driven by the shaft 23. In the usual manner, the outer end of the shaft 23 is fitted with a pulley 27, or the like. The lathe 15 and the construction thereof is in accordance with the usual practice, with no special apparatus being required for this tool or any other tool on which this device is utilized in order to accomplish use thereof.

In regard to the specific illustration of the lathe 15, it is to be noted that, in some instances, the rotation of shaft 23 may be controlled by the movable carriage 21.

In other instances, the carriage 21 may be moved as by a screw on the shaft 23 with consequent operation of head 29 which may be lowered and connected as by gearing for operation of the shaft 21 and threads thereon.

With reference again to Figs. 1 and 2, the portable power unit 10 further includes vertically disposed frame members 28, the upper ends of which support a platform 30 and a vertically disposed backboard 31. A reversible electric motor 32 is mounted on a shelf 11, while a multi-speed transmission 33, of conventional design, is mounted on the vertical members 28. A shaft 34 of the motor 32 is adapted to support a plurality of pulleys 35, while an input shaft 36 for the transmission 33 supports a second plurality of pulleys 37. A pair of belts 38 extend between the pulleys 35 and 37, thereby to provide driving means for the transmission 33. An output shaft 40 from the transmission 33 is adapted to support a pulley 41 with a belt or chain 42 being adapted for disposition between the pulley 41 and pulley 27. The construction is such that a driving engagement is had between the transmission 33 and the lathe 15 through the shaft 23, gear train 26, rack 24 and gear 25.

With reference primarily to Fig. 3, the motor 32 is provided, as in conventional practice, with forward and reverse windings 43 and 44, respectively, which are connected through suitable relays 45 and 46, respectively, and to a source of electric energy from leads 47, as by suitable leads 48, 50 and 51. A master switch 52 provides a connection between the leads 47 and the balance of this circuit to the motor 32.

A transformer 53 has the primary winding 54 connected to the leads 47 and is provided with a secondary winding 55 from which a reduced electric current may be taken for use in operation of the balance of the device. In this connection, it is to be understood that, in some instances, it may not be necessary to utilize separate sources of electric energy for operation of the motor 32 and for operation of the balance of the circuit; however, in instances where a large reversible motor is incorporated, it may be preferable to utilize 220 or 440 volts, for example, for operation of the motor with this current being reduced through the transformer 53 to 110 volts or other suitable voltage, for example, for use in the balance of the device in order that the operator of the machine may not be subjected to the high initial current through any of the switching mechanism contained in the device. As shown in Fig. 3, the relay 45 is adapted to connect the forward winding 43 of the motor 32, as by closure of contacts 56 when a coil 57 is energized. Energization of the coil 57 will also close contacts 58 of a relay holding circuit defined by leads 60, a normally closed switch 61 and lead 62, through the coil 57 and by a lead 63 to one side of the transformer secondary windings 55, as by a lead 64. The other side of the coil 57 is connected to the other side of the secondary windings 55, as by a lead 65 and through a normally closed stop switch 66. The relay 46 is connected in a like manner to the reverse windings 44 of the motor 32 and adapted to energize these reverse windings by closure contacts 67 when a coil 68 is energized. A second set of contacts 70, of a holding circuit, acts through a lead 71, that is connected to the lead 63, and a lead 72, normally closed switch 73 and lead 74 to one side of the coil 68, as by a lead 75. The other side of the coil 68 is connected to the transformer lead 65, as by a lead 76. The construction of the relays 45 and 46 and the contacts thereof is such as to maintain the respective relays in a closed position upon momentary energization of one or the other coils 57 or 68. The relays 45 and 46 are also mechanically latched together, as by a pair of latching arms 77 and an interconnecting link arm 78, so that as one relay is energized, the opposite relay will be pulled out of engagement with the contacts associated therewith.

In order initially to energize the relays 45 and 46, a pair of normally open primary switches 80 and 81 are provided. The switch 80 has one side connected to the transformer lead 64, while the other side is connected to the lead 62, as by a lead 82, whereby to energize the coil 57 upon closure of this switch 80. The switch 81 has one side connected to the transformer lead 64, as by a lead 83, while the other side is connected to the lead 75, as by a lead 84. Accordingly, when the switch 81 is closed, the coil 68 will be energized.

In addition to the switches 80 and 81, a pair of normally open switches 85 and 86 are connected in parallel therewith in order to duplicate the function thereof, as will be hereinafter more fully described. The switch 85 has one side connected to the lead 82, the other side thereof being connected to the transformer lead 64, as by a lead 87. The switch 86 has one side connected to the lead 75, with the other side being connected to the lead 87, as by a lead 88. The switches 66, 85 and 86 may be installed in a common remote control box 79 which may be connected to the balance of the device as by a cable 89, thereby to enable remote control of the power unit.

It is to be noted that the switches 61, 73, 80 and 81 are arranged for remote location with respect to the balance of the electric circuit utilized with the present device. As shown primarily in Fig. 1, these switches may be mounted on any suitable stationary position of the lathe 15 and secured thereto in a removable manner, as by any suitable means. The primary switches 80 and 81 and the switches 61 and 73, which may be termed secondary switches, are adapted for operation as by contact thereof with a switch actuating member 90 that is carried by the movable element of the machine, in this particular example, as by the carriage 21. Additionally, the switches 61 and 63 have pivoted upper end portions or may be arranged in any suitable manner so that actuation thereof toward an open position will be accomplished only when the switch actuating member 90 is moving in a direction from one of the switches 80 or 81 toward the secondary switch positioned adjacent thereto. In other words, the switch 73 will be opened only when the switch actuating member 90 is moving away from the switch 81; and the switch 61 will be actuated only when the switch actuating member 90 is moving away from the switch 80.

In some instances, it may be desirable to eliminate one or the other of the secondary switches 61 or 73 or one or the other of the primary switches 80 or 81, depending upon the particular operation desired from the machine with which the power unit is being used. Inasmuch as the primary and secondary switches are all arranged on the ends of cables, as indicated at 91, 92, 93 and 94, these cables carrying the various leads, any or all of the primary and secondary switches may be removed or placed in different positions as may be desired. It is to be noted that the primary switches 80 and 81 are positioned at the ends of travel of the movable element 21 of the machine 15, while the secondary switches 61 and 73 are positioned adjacent the respective primary switches. In order that ease of operation of the power unit may be effected, the switches 61, 73, 80 and 90 may be of the "micro" switch type which require only slight pressure and have a small travel during operation thereof.

In addition to the hereinbefore described positions of the switches 61, 73, 80 and 90, it may be seen that the secondary switches 61 and 73 may be so positioned as to be opened by movement of the carriage 21 toward the primary switches associated therewith. In such an instance, the motor 32 would be de-energized upon passage of the carriage 21 over one of the secondary switches and would continue to coast driving the carriage at an increasingly slower rate until the associated primary switch was closed. This arrangement will permit operation of the machine in a manner to relieve shock loads that may be imposed by rapid changes in direction of operation of the control, driving means and movable element.

Operation of the device is initiated by closing one or the other of the switches 85 or 86, depending upon the direction of travel first desired for the movable element 21. If the switch actuating member 90 is intermediate one of the pairs of primary and secondary switches, the switch 85 or 86 must be held in a closed position until the movable element passes the associated secondary switch, whereupon the movable element 21 will continue in one direction until the opposite primary switch is engaged and closed, thus energizing the opposite relay 45 or 46, as the case may be, and reversing the direction of operation of the motor 32. This action will cause an immediate reversal of the movable element 21 with the switch actuating member 90 thereafter engaging the adjacent secondary switch to break the circuit to the energized relay, thus interrupting the flow of electric energy to the motor 32 and permitting the motor to gradually slow to a stop. In cases where continued reciprocating operation is desired, the secondary switches 61 and 73 may be moved to a position out of engagement with the switch actuating member 90, thereby permitting the member 90 alternately to engage and close the switches 80 and 81, thus instantaneously and precisely changing the direction of operation and movement of the movable element 21. In most cases, however, as for example, in the case of tapping a bored hole, a single primary switch and a single secondary switch will be utilized in order that the tap would be moved to the base of the hole, immediately reversed in direction of operation, the machine thereafter being shut off and permitted to gradually come to a stopped position after opening of the secondary switch.

Operation of the machine may also be terminated by opening of the switch 66, which serves the same function as opening either of the secondary switches 61 or 73.

It may thus be seen that the present portable power unit, and remote controls therefor, is adapted for use with a variety of machine tools or precision stroking devices and that the arrangement of the primary and secondary switches may be varied at will to accomplish a variety of machine operations. It may also be seen that instantaneous reversal and subsequent gentle slow down is possible through use of the simplified electrical device without the necessity of resorting to complex mechanical direction change mechanisms, complex and expensive clutches or other like mechanisms.

Through use of the present portable power unit, it is to be noted that considerable amounts of lost motion between the motor 32 and the work may take place while still maintaining precision operation on a guaranteed basis due to the direct positioning of the control switch at the point of working and in a position commensurate with precision desired. The tool and/or die position relative to a workpiece may be reliably determined and predicted in repeated operations and may be controlled within a very few thousandths of an inch even though substantial changes may be experienced in atmospheric temperature and barometric pressure. This latter control ability is not found in prior devices designed to accomplish functions similar to that of the present portable power unit.

Having thus described the invention and the present embodiment thereof, it is desired to emphasize the fact that many modifications may be resorted to in a manner limited only by a just interpretation of the following claims.

I claim:

1. A portable power unit for use with a machine comprising: a reversible motor; power transmission means for interconnecting said motor with and for driving said machine; a movable element on said machine, said element being adapted for reciprocal movement by said transmission means; multiple switch means adapted for disposition adjacent at least one end of travel of said movable element; means carried by said movable element for engaging said multiple switch means; and means responsive by engagement of at least one switch of said multiple switch means for energizing said reversible motor for operation in a reverse direction to cause a change in the direction of movement of said movable element, engagement of at least one other switch being adapted to cause de-energization of said motor after said change in direction is accomplished.

2. A portable power unit for use with a machine comprising: a reversible motor; power transmission means for interconnecting said motor with and for driving said machine; a movable element on said machine, said element being adapted for reciprocal movement by said transmission means; primary and secondary switch means adapted for disposition in pairs adjacent each other and adjacent at least one end of travel of said movable element; means carried by said movable element for engaging said primary and secondary switch means; means rendering said secondary switch means inoperative when engaged by said means carried by said movable element when said element is moving in a direction toward said primary switch means; and means responsive to engagement of said primary switch means for energizing said reversible motor for operation in a reverse direction to cause a change in the direction of movement of said movable element, engagement of said secondary switch means being adapted to cause de-energization of said motor after said change in direction of said movable element is accomplished.

3. A portable power unit for use as a shop item for providing motive power for a machine tool or the like, having a stationary portion and a reciprocally movable element, comprising: a castor supported frame structure; a reversible electric motor mounted on said structure; a transmission, said transmission being adapted for driving connection with said machine tool whereby to reciprocate said movable element in accordance with the rotational direction of said electric motor; a pair of primary switches removably mounted on said stationary portion adjacent each end of travel of said movable element; at least one secondary switch removably mounted on said stationary structure intermediate said primary switches; a switch operating member carried by said movable element; relay means having contacts thereof electrically connected in association with a source of electrical energy and directional coils of said motor; holding circuit means for said relay means; circuit means interconnecting said primary switches and said relay means for changing rotational direction of said motor upon alternate closure of said primary switches; and circuit means interconnecting said holding circuit means and said secondary switch, whereby, upon opening thereof, to interrupt the flow of electrical energy to said motor.

4. A portable power unit for use as a shop item for providing motive power for a machine tool or the like, having a stationary portion and a reciprocally movable element, comprising: a castor supported frame structure; a reversible electric motor mounted on said structure; a transmission, said transmission being adapted for driving connection with said machine tool whereby to reciprocate said movable element in accordance with the rotational direction of said electric motor; a pair of normally open primary switches removably mounted on said stationary portion adjacent each end of travel of said movable element; at least one normally closed secondary switch removably mounted on said stationary structure intermediate said primary switches; a switch operating member carried by said movable element; relay means having contacts thereof electrically connected in association with a source of electrical energy and directional coils of said motor; holding circuit means for said relay means; circuit means interconnecting said primary switches and said relay means for changing rotational direction of said motor upon alternate closure of said primary switches; circuit means interconnecting said holding circuit means and said secondary switch, whereby, upon opening thereof, to interrupt the flow of electrical energy to said motor; and means rendering said secondary switch inoperative when said movable element is being driven in one direction.

5. A portable power unit for use as a shop item for providing motive power for a machine tool or the like, having a stationary portion and a reciprocally movable element, comprising: a castor supported frame structure; a reversible electric motor mounted on said structure; a transmission, said transmission being adapted for driving connection with said machine tool whereby to reciprocate said movable element in accordance with the rotational direction of said electric motor; a pair of normally open primary switches removably mounted on said stationary portion adjacent each end of travel of said movable element; at least one normally closed secondary switch removably mounted on said stationary structure intermediate said primary switches; a switch operating member carried by said movable element; relay means having contacts thereof electrically connected in association with a source of electrical energy and directional coils of said motor; a separate source of electrical energy for said switches and said relay means; holding circuit means for said relay means; circuit means interconnecting said primary switches and said relay means for changing rotational direction of said motor upon alternate closure of said primary switches; circuit means interconnecting said holding circuit means and said secondary switch, whereby, upon opening thereof, to interrupt the flow of electrical energy to said motor; and means rendering said secondary switch inoperative when said movable element is being driven in one direction.

6. A remote controlled power unit for machine tools or the like wherein a cutting, forming or the like tool may be carried by a reciprocating element, the combination of: a reversible electric motor; a relay controlled switching circuit for energizing said motor for operation in one direction or another; transmission means for connecting said motor with said machine; separate sources of electrical energy for said motor and said switching circuit; machine mounted and element travel actuable switch means for operating said switching circuit thereby to effect alternating changes in direction of movement of said element; and means to interrupt the flow of electrical energy to said motor immediately after at least one change in direction of said element.

7. A remote controlled power unit for machine tools or the like wherein a cutting tool may be carried by a reciprocating element, the combination of: a reversible electric motor; a relay controlled switching circuit for energizing said motor for operation in one direction or another; transmission means for connecting said motor with said machine; separate sources of electrical energy for said motor and said switching circuit; remote machine mounted and element travel actuable switch means for operating said switching circuit thereby to effect alternating changes in direction of movement of said element; and remote machine mounted and element travel actuable switch means to interrupt the flow of electrical energy to said motor immediately after at least one change in direction of said element.

8. A remote controlled power unit for machine tools or the like wherein a cutting tool may be carried by a reciprocating element, the combination of: a reversible electric motor; a relay controlled switching circuit for energizing said motor for operation in one direction or another; transmission means for connecting said motor with said machine; separate sources of electrical energy for said motor and said switching circuit; remote machine mounted and element travel actuable switch means for operating said switching circuit thereby to effect alternating changes in direction of movement of said element; remote machine mounted and element travel actuable switch means to interrupt the flow of electrical energy to said motor immediately after at least one change in direction of said element; and auxiliary switch means connected in parallel with said first mentioned switch means.

References Cited in the file of this patent

UNITED STATES PATENTS

| | | |
|---|---|---|
| 1,394,763 | Scott | Oct. 25, 1921 |
| 2,307,514 | King | Jan. 5, 1943 |
| 2,479,153 | Buss | Aug. 16, 1949 |